(12) United States Patent
Imamura et al.

(10) Patent No.: US 7,661,700 B2
(45) Date of Patent: Feb. 16, 2010

(54) KNEE AIRBAG DEVICE

(75) Inventors: Kenji Imamura, Kosai (JP); Osamu Fukawatase, Nishikamo-gun (JP); Akiyoshi Sanada, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 132 days.

(21) Appl. No.: 11/984,801

(22) Filed: Nov. 21, 2007

(65) Prior Publication Data
US 2008/0122205 A1 May 29, 2008

(30) Foreign Application Priority Data
Nov. 24, 2006 (JP) ............... 2006-317685

(51) Int. Cl.
*B60R 21/18* (2006.01)
(52) U.S. Cl. ............... 280/730.1; 280/743.2
(58) Field of Classification Search ............ 280/730.1, 280/731, 732, 733, 743.2
See application file for complete search history.

(56) References Cited

U.S. PATENT DOCUMENTS

| | | | |
|---|---|---|---|
| 5,570,901 A | | 11/1996 | Fyrainer |
| 6,942,245 B2 | | 9/2005 | Takimoto et al. |
| 7,182,365 B2 | * | 2/2007 | Takimoto et al. .......... 280/730.1 |
| 7,347,445 B2 | * | 3/2008 | Choi ........................ 280/729 |
| 7,384,065 B2 | | 6/2008 | Takimoto et al. |
| 2002/0171232 A1 | * | 11/2002 | Abe ....................... 280/730.1 |
| 2003/0107206 A1 | * | 6/2003 | Takimoto et al. .......... 280/730.1 |
| 2003/0120409 A1 | * | 6/2003 | Takimoto et al. .............. 701/45 |
| 2004/0245750 A1 | * | 12/2004 | Takimoto et al. .......... 280/730.1 |
| 2005/0062265 A1 | * | 3/2005 | Hotta et al. .............. 280/730.1 |
| 2008/0067790 A1 | * | 3/2008 | Narin et al. .............. 280/730.1 |
| 2008/0106080 A1 | * | 5/2008 | Fukawatase et al. ..... 280/730.1 |
| 2008/0122205 A1 | * | 5/2008 | Imamura et al. .......... 280/730.1 |
| 2008/0258441 A1 | * | 10/2008 | Takimoto et al. .......... 280/730.1 |

FOREIGN PATENT DOCUMENTS

| | | |
|---|---|---|
| JP | A-05-208653 | 8/1993 |
| JP | A-09-104317 | 4/1997 |
| JP | B2-2759065 | 3/1998 |
| JP | A-2002-37003 | 2/2002 |
| JP | A-2003-170801 | 6/2003 |
| JP | A-2003-205816 | 7/2003 |
| JP | A-2005-335593 | 12/2005 |
| JP | B2-3752920 | 12/2005 |
| JP | A-2006-008105 | 1/2006 |
| JP | B2-3760424 | 1/2006 |
| WO | WO 02/04261 | 1/2002 |

* cited by examiner

*Primary Examiner*—Paul N Dickson
*Assistant Examiner*—Karen Jane J Amores
(74) *Attorney, Agent, or Firm*—Oliff & Berridge, PLC

(57) ABSTRACT

A knee airbag device includes a knee airbag that is disposed in a folded state inside a steering column cover. When the knee airbag receives gas, the knee airbag is inflated and deployed from an inside of the steering column cover toward knees of an occupant. The thickness of outer portions of the knee airbag, which are positioned outside centers of the knees when the knee airbag is deployed, is set to be larger than the thickness of a general portion of the knee airbag, which is positioned in front of the knees when the knee airbag is deployed.

4 Claims, 6 Drawing Sheets

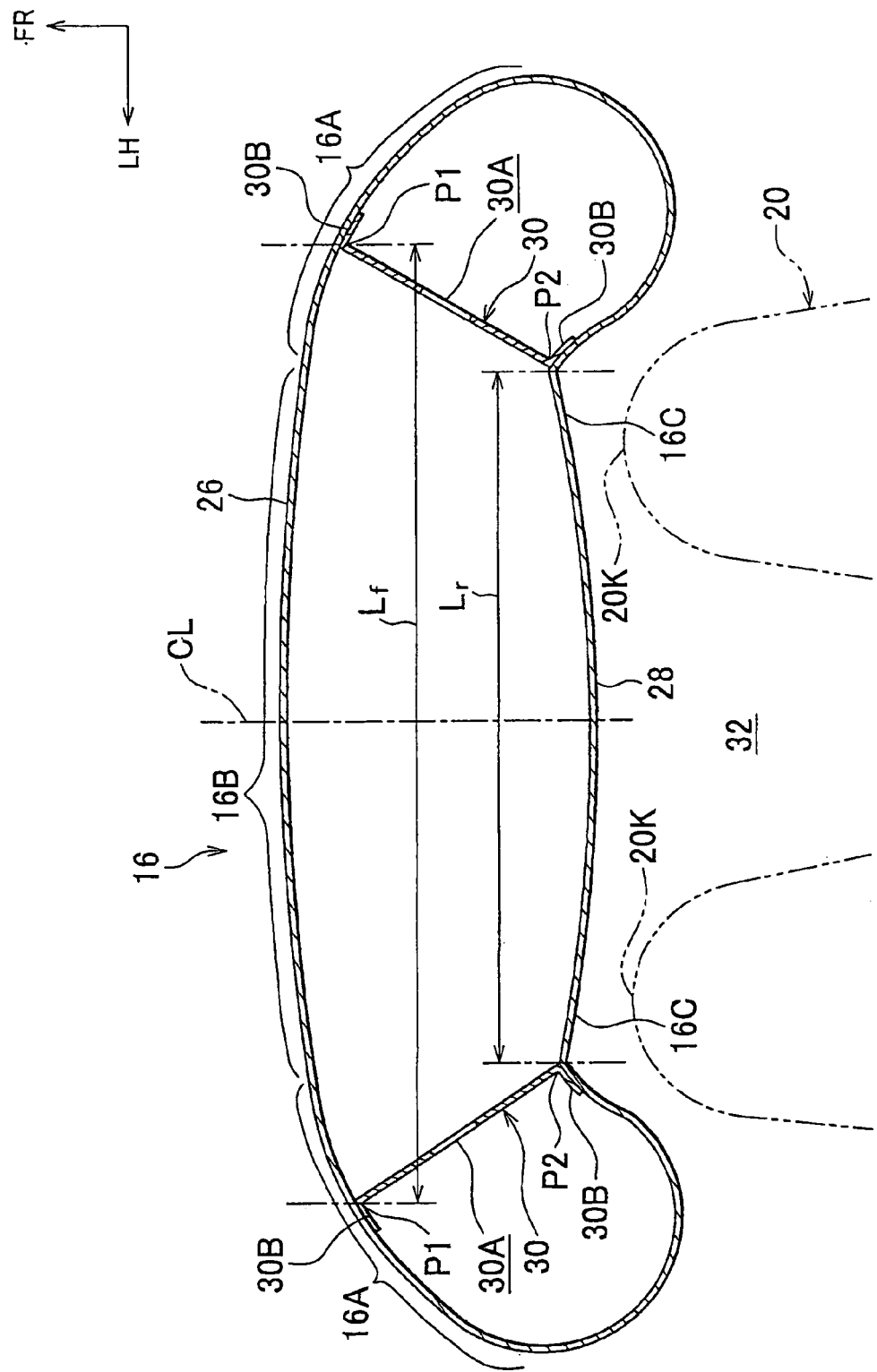

KNEE AIRBAG DEVICE

INCORPORATION BY REFERENCE

The disclosure of Japanese Patent Application No. 2006-317685 filed on Nov. 24, 2006 including the specification, drawings and abstract is incorporated herein by reference in its entirety.

BACKGROUND OF THE INVENTION

1. Field of the Invention

The invention relates to a knee airbag device.

2. Description of the Related Art

Japanese Patent Application Publication No. 2002-37003 (JP-A-2002-37003) describes a knee airbag device in which a knee airbag module is disposed inside a steering column cover that covers a steering column.

However, in the above-described knee airbag device, when a knee airbag is deployed between an instrument panel and knees of an occupant, the knee airbag is likely to enter an area between the knees in a vehicle-width direction. Therefore, it is difficult to suppress the widening of the distance between the knees.

SUMMARY OF THE INVENTION

The invention suppresses widening of a distance between knees of an occupant when a knee airbag restrains the knees of the occupant.

A first aspect of the invention relates to a knee airbag that is disposed in a folded state inside a steering column cover. When the knee airbag receives gas, the knee airbag is inflated and deployed from an inside of the steering column cover toward knees of an occupant. The thickness of outer portions of the knee airbag, which are positioned outside centers of the knees when the knee airbag is deployed, is set to be larger than the thickness of a general portion of the knee airbag, which is positioned in front of the knees when the knee airbag is deployed. According to a second aspect of the invention, a distance between an instrument panel and a point closest to a rear of a vehicle in each of outer portions of the knee airbag, which are positioned outside centers of the knees when the knee airbag is deployed is set to be larger than a distance between the instrument panel and a point closest to the rear of the vehicle in a general portion of the knee airbag, which is positioned in front of the knees when the knee airbag is deployed.

According to the above-described aspects, for example, when the vehicle has a frontal collision, the knee airbag, which is disposed in the folded state inside the steering column cover, receives the gas, and is inflated and deployed from the inside of the steering column cover toward the knees of the occupant. Thus, the knee airbag restrains the knees. The thickness of the outer portions of the knee airbag, which are positioned outside the centers of the knees, is set to be larger than the thickness of the general portion at this time. The shape of the deployed knee airbag may be regulated such that the distance between the instrumental panel and the point closest to the rear of the vehicle in each of outer portions is larger than the distance between the instrument panel 22 and the point closest to the rear of the vehicle in the general portion of the knee airbag. Therefore, the outer portions suppress the widening of the distance between the knees.

In the knee airbag device according to the aspects, the knee airbag may include an instrument panel-side foundation cloth positioned close to an instrument panel when the knee airbag is deployed, an occupant-side foundation cloth positioned close to the occupant when the knee airbag is deployed, at least one right tether disposed in a right portion of the knee airbag, and at least one left tether disposed in a left portion of the knee airbag. Each of the at least one right tether and the at least one left tether may connect the instrument panel-side foundation cloth and the occupant-side foundation cloth, and may regulate a thickness of the knee airbag. First connection points at which the right and left tethers are connected to the instrument panel-side foundation cloth may be set to be outside second connection points at which the right and left tethers are connected to the occupant-side foundation cloth, with respect to a center of the knee airbag in a vehicle-width direction.

According to the above-described aspects, each of the right and left tethers connects the instrument panel-side foundation cloth and the occupant-side foundation cloth of the knee airbag. Also, the first connection points at which the right and left tethers are connected to the instrument panel-side foundation cloth are set to be outside second connection points at which the right and left tethers are connected to the occupant-side foundation cloth, with respect to the center of the knee airbag in the vehicle-width direction. Therefore, the outer portions are pulled toward the rear of the vehicle, as compared to the general portion. As a result, the shape of the deployed knee airbag is regulated such that the thickness of the outer portions is larger than the thickness of the general portion. The knees of the occupant contact the portion of the knee airbag, which is inside the outer portions, and thus the knees are restrained. Therefore, the outer portions suppress the widening of the distance between the knees of the occupant.

In the knee airbag device according to the above-described aspects, the knee airbag may be folded such that ridges of pleats are oriented upward and downward in a vehicle-height direction, and then, right and left side portions of the knee airbag in the vehicle-width direction are rolled up toward the instrument panel, and the folded knee airbag is stored inside the steering column cover.

According to the above-described aspects, the knee airbag is folded such that the ridges of the pleats are oriented upward and downward in the vehicle-height direction, and then, right and left side portions of the knee airbag in the vehicle-width direction are rolled up toward the instrument panel. The folded knee airbag is stored inside the steering column cover. Therefore, although the thickness of the outer portions is larger than the thickness of the general portion when the knee airbag is deployed, it is possible to deploy the knee airbag in front of the knees of the occupant. Therefore, it is possible to improve the performance of restraining the knees by suppressing the widening of the distance between the knees.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein:

FIG. 3 is an enlarged cross sectional view showing the knee airbag that is deployed in front of the knees of the occupant, and whose shape is regulated by the tethers;

DETAILED DESCRIPTION OF THE EMBODIMENTS

Figure 1:
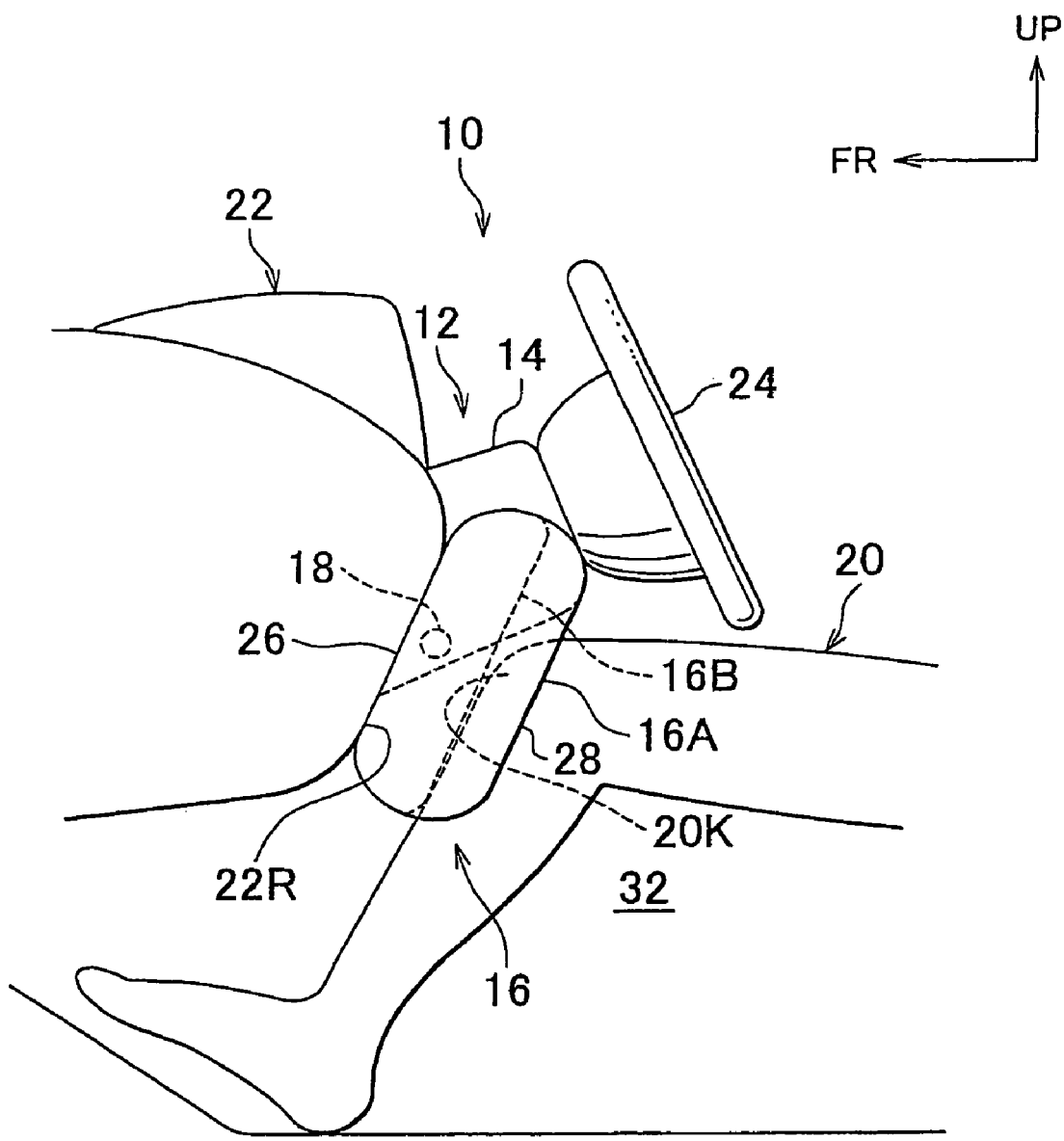
FIG. 1 is a lateral view showing a situation where a knee airbag of a knee airbag device is deployed from the inside of a steering column cover toward a vehicle cabin, and the knee airbag restrains the knees of an occupant.

Hereinafter, an embodiment of the invention will be described with reference to the accompanying drawings. In FIG. 1, a knee airbag device 10 according to the embodiment includes a knee airbag 16. The knee airbag 16 is disposed in a folded state inside a steering column cover 14. For example, when the knee airbag 16 receives gas supplied from an inflator 18, the knee airbag 16 is inflated and deployed from the inside of the steering column cover 14 toward the knees 20K of an occupant 20, i.e., toward a vehicle cabin 32.

A steering column 12 covered by the steering column cover 14 includes a steering main shaft (not shown) and a column tube (not shown). The steering main shaft is disposed in the core of the steering column 12. The column tube, which covers the steering main shaft, is supported by a vehicle body. The front end portion of the steering column 12 is inserted through an opening portion (not shown) formed in an instrument panel 22. The rear end portion of the steering column 12 protrudes from the instrument panel 32 toward the rear of a vehicle. A steering wheel 24 is attached to the end of the steering main shaft. The steering wheel 24 is used to steer the vehicle.

An airbag module (not shown) is stored inside the steering column cover 14. The airbag module includes the knee airbag 16 in the folded state, and the inflator 18 that supplies the gas to the knee airbag 16 to deploy the knee airbag 16. The inflator 18 is operated by ignition current supplied from an airbag ECU (not shown). When the knee airbag 16, which receives the gas from the inflator 18, is inflated and deployed, an airbag door (not shown) provided in the steering column cover 14 is opened due to deployment pressure of the knee airbag 16. As a result, an opening portion (not shown) is formed by opening the airbag door, and the knee airbag 16 protrudes from the opening portion into the vehicle cabin 32.

Figure 2:
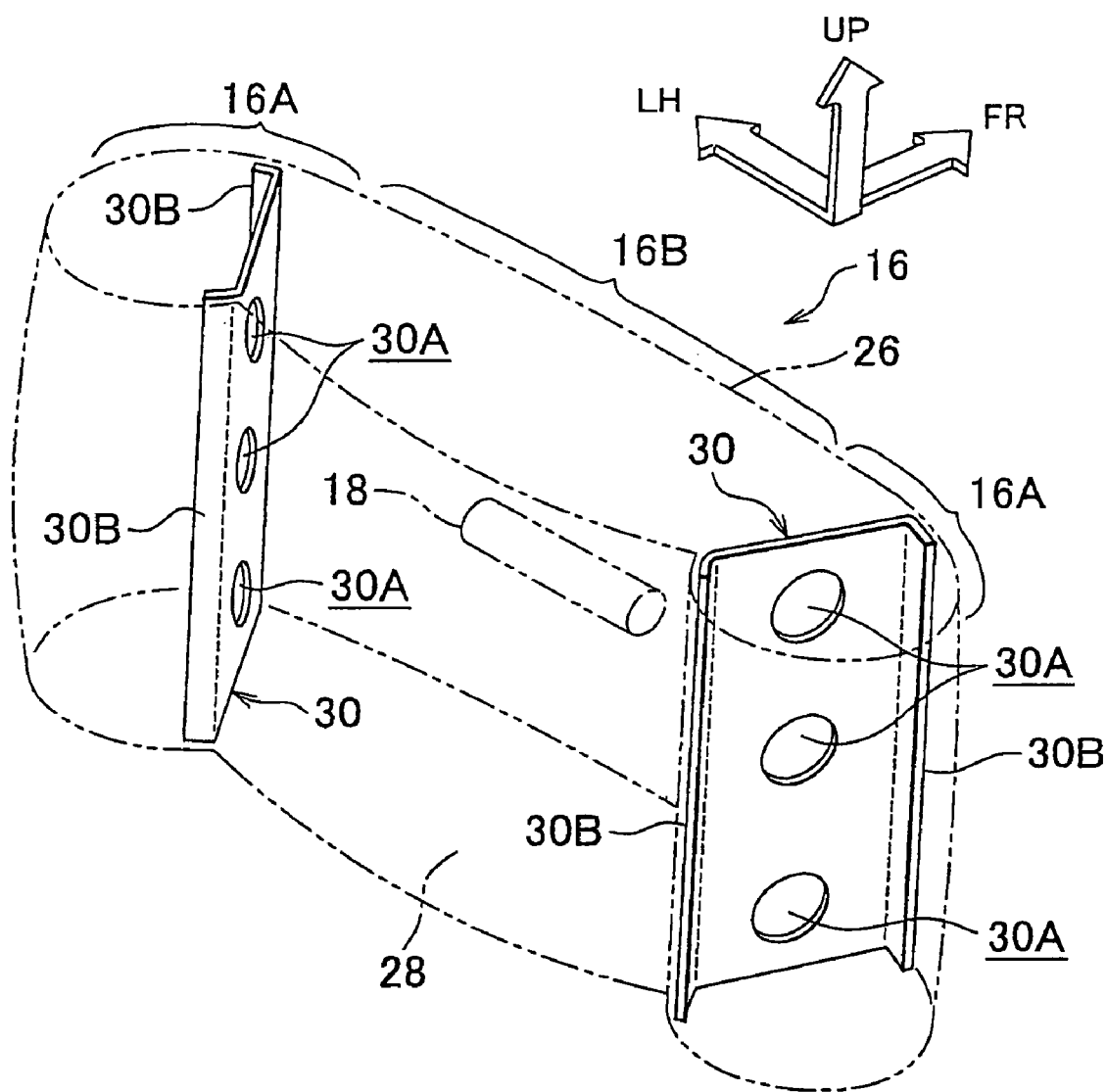
FIG. 2 is an enlarged perspective view showing the deployed knee airbag whose shape is regulated by tethers, and an inflator.

In FIG. 1, the knee airbag 16 is formed to have a bag shape, by sewing an instrument panel-side foundation cloth 26 and an occupant-side foundation cloth 28 together. When the knee airbag 16 is deployed, the instrument panel-side foundation cloth 26 is positioned close to the instrument panel 22, and the occupant-side foundation cloth 28 is positioned close to the occupant 20. As shown in FIG. 2 and FIG. 3, the shape of the deployed knee airbag 16 is regulated by tethers 30 that connect the instrument panel-side foundation cloth 26 and the occupant-side foundation cloth 28. The thickness (the length in a vehicle-longitudinal direction) of outer portions 16A is set to be larger than the thickness of a general portion 16B. The outer portions 16A are positioned outside centers of the knees 20K when the knee airbag 16 is deployed.

More specifically, as shown in FIG. 3, the tethers 30 are connected to the instrument panel-side foundation cloth 26 at connection points P1, and connected to the occupant-side foundation cloth 28 at connection points P2. The connection points P1 are set to be outside the connection points P2 with respect to the center line CL of the knee airbag 16 in a vehicle-width direction when the knee airbag 16 is deployed. Thus, a length Lf between the right and left connection points P1 in the vehicle-width direction is longer than a length Lr between the right and left connection points P2 in the vehicle-width direction.

As shown in FIG. 2, each tether 30 is sewn to each of the instrument panel-side foundation cloth 26 and the occupant-side foundation cloth 28 at a sewn portion 30B that extends over the entire length of the tether 30 in the height direction of the knee airbag 16 (i.e., in a vehicle-height direction). For example, three vent holes 30A are formed in each tether 30. When the knee airbag 16 is inflated and deployed, the gas, which is supplied to the general portion 16B from the inflator 18, flows to the outer portions 16A through the vent holes 30A. In the knee airbag device 10, by using the tethers 30, it is possible to regulate the thickness of the knee airbag 16 so that the thickness of the outer portions 16A of the knee airbag 16 is larger than the thickness of the general portion 16B of the knee airbag 16.

The word "the outer portions 16A of the knee airbag 16" signifies portions of the deployed knee airbag 16, which are positioned outside the centers of the knees 20K with respect to the center line CL of the knee airbag 16 in the vehicle-width direction, as shown in FIG. 3. The phrase "the thickness of the outer portions 16A is larger than the thickness of the general portion 16B" signifies that the outer portions 16A protrude toward the rear of the vehicle as compared to the knee front portions 16C of the general portion 16B, which are positioned in front of the knees 20K, so that the outer portions 16A expand toward areas outside the knees 20K when the knee airbag 16 restrains the knees 20K. In other words, when the knee airbag 16 restrains the knees 20K, the form of the knee airbag 16 is such that the knee front portions 16C are recessed toward the front of the vehicle, as compared to the outer portions 16A. A portion of the general portion 16B other than the knee front portions 16C may have any shape when the knee airbag 16 is deployed. However, it is preferable that the portion of the general portion 16B other than the knee front portions 16C should have such a shape that does not widen the distance between the knees when the knee airbag 16 is deployed.

In addition to, or instead of the tethers 30, for example, straps (not shown) that extend in the vehicle-width direction may be provided inside the knee airbag 16, to regulate the flow of the gas from the inflator 18, or to regulate the shape of the deployed knee airbag 16.

Figure 4A:
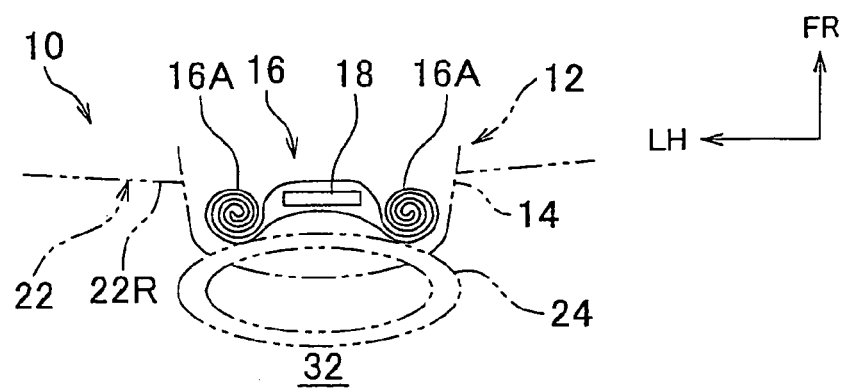
FIG. 4A is a cross sectional view showing a situation where the knee airbag of the knee airbag device is stored inside the steering column cover such that right and left side portions of the knee airbag in a vehicle-width direction are rolled up toward an instrument panel.

For example, as shown in FIG. 4A, the knee airbag 16 is spread out flat in such a manner that one of the instrument panel-side foundation cloth 26 and the occupant-side foundation cloth 28 is placed on the other. Then, the upper end and the lower end of the knee airbag 16 are folded toward a center of the knee airbag 16 in the height direction of the knee airbag 16 to reduce the length of the knee airbag 16 in the height direction of the knee airbag 16. Then, right and left side portions of the knee airbag 16 in the vehicle-width direction are rolled up toward the instrument panel 22, that is, toward the front of the vehicle. The knee airbag 16 that is folded and rolled up is stored in the steering column cover 14. This prevents the outer portions 16A, which are thicker than the general portion 16B when the knee airbag 16 is deployed as shown in FIG. 3, from interfering with the knees 20K in the process in which the knee airbag 16 is deployed.

The surface 22R of the instrument panel 22, which is positioned in front of the knees 20K of the occupant, is inclined toward the front of the vehicle in a direction from a position near the steering column cover 14 toward the bottom of the vehicle. Reaction force, which is used to restrain the knees 20K when the knee airbag 16 is inflated and deployed, is generated by the surface 22R of the instrument panel 22.

Figure 4B:
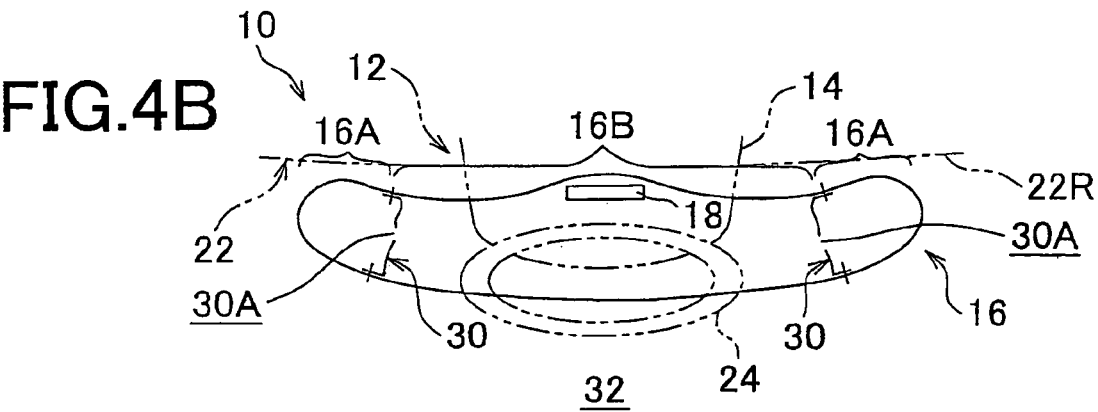
FIG. 4B is a cross sectional view showing a situation where the knee airbag, which receives gas from the inflator, protrudes from the inside of the steering column cover toward a vehicle cabin, and outer portions of the knee airbag are deployed toward the right and left in the vehicle-width direction.

In the embodiment, the knee airbag device 10 has the above-described configuration. Hereinafter, the advantageous effects of the knee airbag device 10 will be described. In FIG. 4A, for example, when a frontal collision of the vehicle occurs, and the airbag ECU (not shown) determines that a frontal collision of the vehicle occurs, the airbag ECU supplies the ignition current to the inflator 18, and the inflator 18 is operated to supply a large amount of gas to the knee airbag 16 in the folded state. Then, the airbag door (not shown) in the steering column cover 14 is opened due to the deployment pressure of the knee airbag 16. As a result, the knee airbag 16 is inflated and deployed from the inside of the steering column cover 14 toward the vehicle cabin 32 as shown in FIG. 4B.

As shown in FIG. 4A, the upper end and the lower end of the knee airbag 16 are folded toward a center of the knee airbag 16 in the height direction of the knee airbag 16, and the right and left side portions in the vehicle-width direction are rolled up toward the instrument panel 22. The knee airbag 16 that is folded and rolled up is stored inside the steering column cover 14. Therefore, although the outer portions 16A are thicker than the general portion 16B when the knee airbag 16 is deployed, it is possible to deploy the knee airbag 16 in front of the knees 20K of the occupant seated on a vehicle seat 34, as shown in FIG. 5.

Figure 4C:
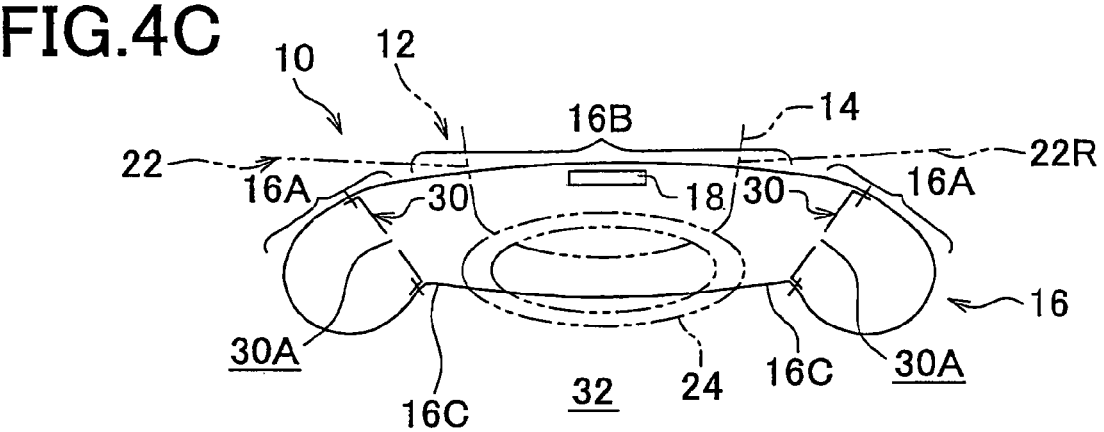
FIG. 4C is a cross sectional view showing a situation where the knee airbag is completely deployed.

More specifically, first, the gas is supplied to the general portion 16B of the knee airbag 16 from the inflator 18, and then the gas is supplied from the general portion 16B to the outer portions 16A through the vent holes 30A of the tethers 30. Thus, as shown in FIG. 4B, the outer portions 16A of the knee airbag 16, which have been in a rolled-up state, are deployed toward the right and left in the vehicle-width direction. At this time, as shown in FIG. 3, in the knee airbag 16, the connection points P1 at which the tethers 30 are connected to the instrument panel-side foundation cloth 26 are set to be outside the connection points P2 at which the tethers 30 are connected to the occupant-side foundation cloth 28, with respect to the center line CL of the knee airbag 16 in the vehicle-width direction. Therefore, the outer portions 16A are pulled toward the rear of the vehicle, as compared to the general portion 16B. As a result, as shown in FIG. 4C, the shape of the deployed knee airbag 16 is regulated such that the thickness of the outer portions 16A is larger than the thickness of the general portion. 16B. In the other words, the shape of the deployed knee airbag 16 is regulated such that a distance between the instrumental panel 22 and a point closest to a rear of the vehicle in each of outer portions 16A is larger than a distance between the instrument panel 22 and a point closest to the rear of the vehicle in the general portion 16B of the knee airbag.

More specifically, in the process in which the knee airbag 16 is deployed, because the tethers 30 regulate the deployed shape of the knee airbag 16, the rear portions of the outer portions 16A are slack. Therefore, the gas flows into the slack portions, and thus, the outer portions 16A expand toward the rear of the vehicle, as compared to the knee front portions 16C of the general portion 16B. As shown in FIG. 2, the outer portions 16A are formed to be, for example, substantially cylindrical protruding portions that expand in the vehicle-height direction. After the outer portions 16A, which have been in the rolled-up state, are deployed in the vehicle-width direction, the outer portions 16A expand toward the rear of the vehicle. Therefore, before the outer portions 16A expand toward the rear of the vehicle, the outer portions 16A do not interfere with the knees 20K. Thus, it is possible to stably deploy the knee airbag 16 in front of the knees 20K.

Figure 5:
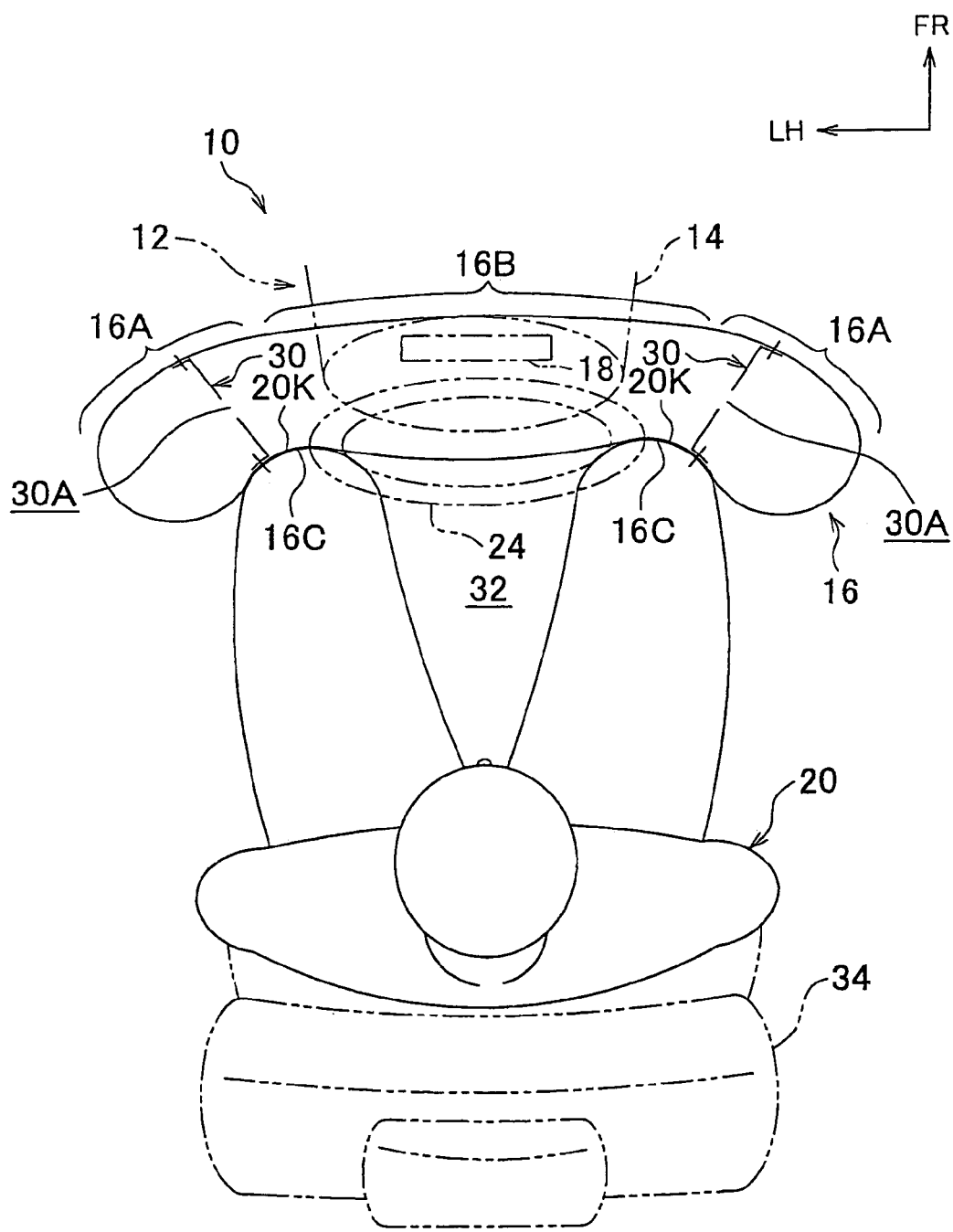
FIG. 5 is a plan view showing a situation where the knee airbag restrains the knees of the occupant seated on a vehicle seat, and the outer portions of the knee airbag suppress the widening of a distance between the knees of the occupant, and a cross sectional view of the knee airbag.

As shown in FIG. 5, when the knee airbag 16 of the knee airbag device 10 is deployed in this manner, the knee airbag 16 restrains the knees 20K of the occupant 20 seated on the vehicle seat 34. The reaction force used to restrain the knees 20K is generated at the surface 22R of the instrument panel 22 (refer to FIG. 1). Also, at this time, the outer portions 16A of the knee airbag 16 expand toward the areas outside the knees 20K. As a result, the knees 20K contact the knee front portions 16C inside the outer portions 16A of the knee airbag 16, and thus, the knees 20K are restrained. This suppresses the widening of the distance between the knees 20K of the occupant.

As shown in FIG. 2, the outer portions 16A are formed to be the protruding portions that extend in the vehicle-height direction when the knee airbag 16 is deployed. Therefore, if the positions of the knees 20K that should be restrained vary in the vehicle-height direction depending on the body size of the occupant 20, it is possible to equally suppress the widening of the distance between the knees 20K of the occupant. Thus, it is possible to improve the performance of restraining the knees 20K of the occupant 20 in the knee airbag device 10 by suppressing the widening of the distance between the knees 20K of the occupant.

In the above-described embodiment, the upper end and the lower end of the knee airbag 16 are folded toward a center of the knee airbag 16 in the height direction of the knee airbag 16, and then, the right and left side portions in the vehicle-width direction are rolled up toward the instrument panel 22. The knee airbag 16 that is folded and rolled up is stored inside the steering column cover 14. However, the method of folding the right and left side portions is not limited to rolling up. Any method of folding may be employed as long as the interference between the outer portions 16A and the knees 20K is prevented in the process in which the knee airbag 16 is deployed.

Figure 6:
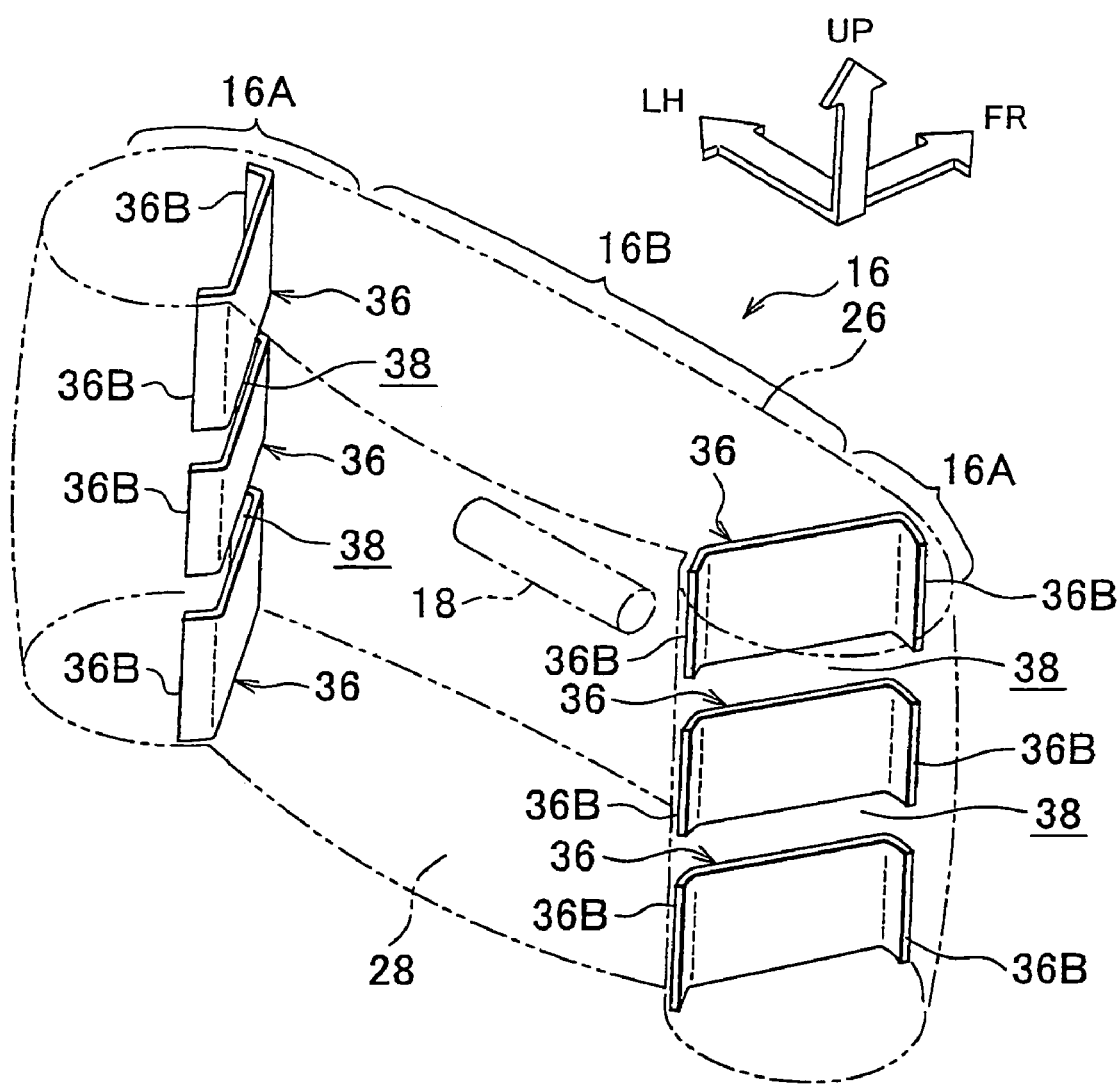
FIG. 6 is a perspective view showing a modified example of the tethers in the deployed knee airbag.

Also, as shown in FIG. 2, the tethers 30 are provided to extend over the substantially entire length of the knee airbag 16 in the height direction of the knee airbag 16 (i.e., the vehicle-height direction). In addition, for example, the three vent holes 30A are formed in each tether 30. However, the configuration of the tethers 30 is not limited to this configuration. For example, as shown in FIG. 6, three right tethers 36 may be disposed in series in the height direction of the knee airbag 16 such that the three right tethers 36 are apart from each other in the height direction of the knee airbag 16. Three left tethers 36 may be disposed in series in the height direction of the knee airbag 16 such that the three left tethers 36 are apart from each other in the height direction of the knee airbag 16. In this case, the gas flows from the general portion 16B to the outer portions 16A through gaps 38 between the tethers 36. Each of the tethers 36 (the three right tethers 36 and the three left tethers 36) is sewn to each of the instrument panel-side foundation cloth 26 and the occupant-side foundation cloth 28 at a sewn portion 36B. In FIG. 2 and FIG. 6, the width of each tether 30 and the width of each tether 36, that is, the distance between the connection point P1 and the connection point P2 shown in FIG. 3 are constant in the height direction of the knee airbag 16. However, the width of each tether 30 and the width of each tether 36 may not be constant.

In FIG. 1, to efficiently generate the reaction force used to restrain the knees 20K at the surface 22R of the instrument panel 22, it is preferable that the knee airbag 16 be deployed along the surface 22R of the instrument panel 22 without interfering with the steering column cover 14 when the knee airbag 16 restrains the knees 20K. Therefore, the shape of the deployed knee airbag 16 may be regulated such that a recessed portion (not shown) is formed in the knee airbag 16 along the shape of a portion of the steering column cover 14 which faces the deployed knee airbag when the knee airbag 16 is deployed.

What is claimed is:

1. A knee airbag device comprising a knee airbag that is disposed in a folded state inside a steering column cover, wherein:
    when the knee airbag receives gas, the knee airbag is inflated and deployed from an inside of the steering column cover toward knees;
    outer portions of the knee airbag, which are positioned outside centers of the knees when the knee airbag is deployed, protrude toward a rear of a vehicle as compared to knee front portions of the knee airbag, which are positioned in front of the knees when the knee airbag is deployed, so that the outer portions expand toward areas outside the knees when the knee airbag is deployed;
    the knee airbag includes an instrument panel-side foundation cloth positioned close to an instrument panel when the knee airbag is deployed, an occupant-side foundation cloth positioned close to the occupant when the knee airbag is deployed, and tethers that connect the instrument panel-side foundation cloth and the occupant-side foundation cloth, and regulate a thickness of the knee airbag;
    first connections at which the tethers are connected to the instrument panel-side foundation cloth are set to be outside second connections at which the tethers are connected to the occupant-side foundation cloth, with respect to a center of the knee airbag in a vehicle-width direction;
    a length between the first connections in the vehicle-width direction is set to be longer than a length between the second connections in the vehicle-width direction;
    the second connections are positioned outside the centers of the knees; and
    when the knee airbag is inflated and deployed, the gas is supplied to a general portion in which the knee front portions are positioned, and then the gas is supplied from the general portion to the outer portions so that the outer portions are deployed toward right and left sides in the vehicle-width direction while rear portions of the outer portions are slack due to regulation by the tethers, and then the outer portions expand toward the rear of the vehicle.

2. The knee airbag device according to claim 1,
    wherein the tethers are on right and left sides of the knee airbag device;
    an inflator, which supplies the gas to the knee airbag to deploy the knee airbag, is provided between the right and left tethers;
    the right and left tethers are provided to extend over a substantially entire length of the knee airbag in a vehicle-height direction;
    vent holes, which allow the gas supplied from the inflator to the general portion to flow to the outer portions when the knee airbag is deployed, are provided in the right and left tethers; and
    the outer portions are formed to be protruding portions that expand in the vehicle-height direction when the knee airbag is deployed.

3. The knee airbag device according to claim 1, wherein:
    the tethers are on right and left sides of the knee airbag device;
    an inflator, which supplies the gas to the knee airbag to deploy the knee airbag, is provided between the right and left tethers;
    the right tethers are disposed such that the right tethers are apart from each other in a height direction of the knee airbag;
    the left tethers are disposed such that the left tethers are apart from each other in the height direction of the knee airbag; and
    the gas from the inflator is supplied from the general portion to the outer portions of the knee airbag through at least one gap between the right tethers and at least one gap between the left tethers in the height direction of the knee airbag; and
    the outer portions are formed to be protruding portions that expand in the vehicle-height direction when the knee airbag is deployed.

4. The knee airbag device according to claim 1, wherein an upper end and a lower end of the knee airbag are folded toward a center of the knee airbag in a height direction of the knee airbag, and then, right and left side portions of the knee airbag in the vehicle-width direction are rolled up toward the instrument panel, and the knee airbag that is folded and rolled up is stored inside the steering column cover.

* * * * *